Patented May 10, 1927.

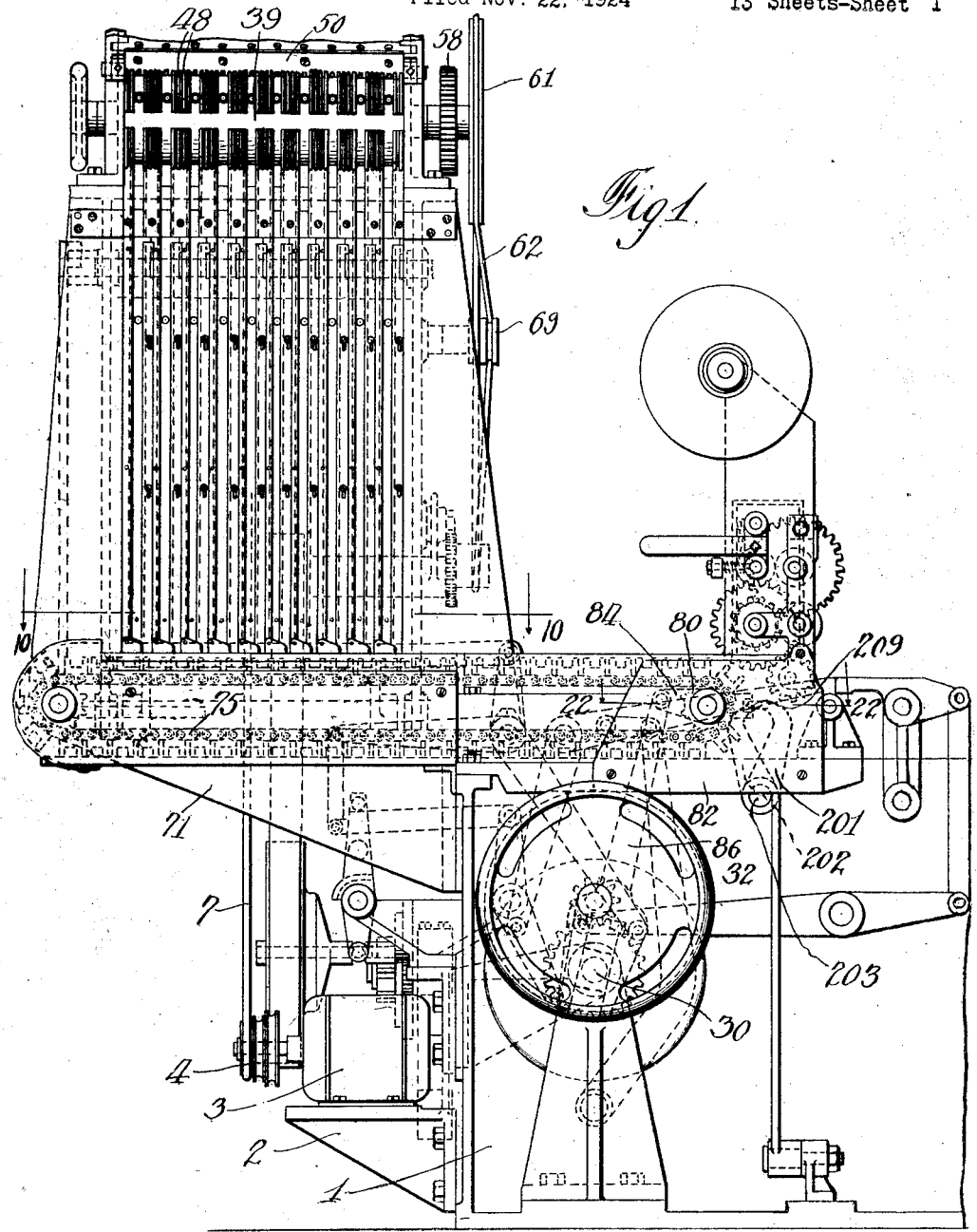

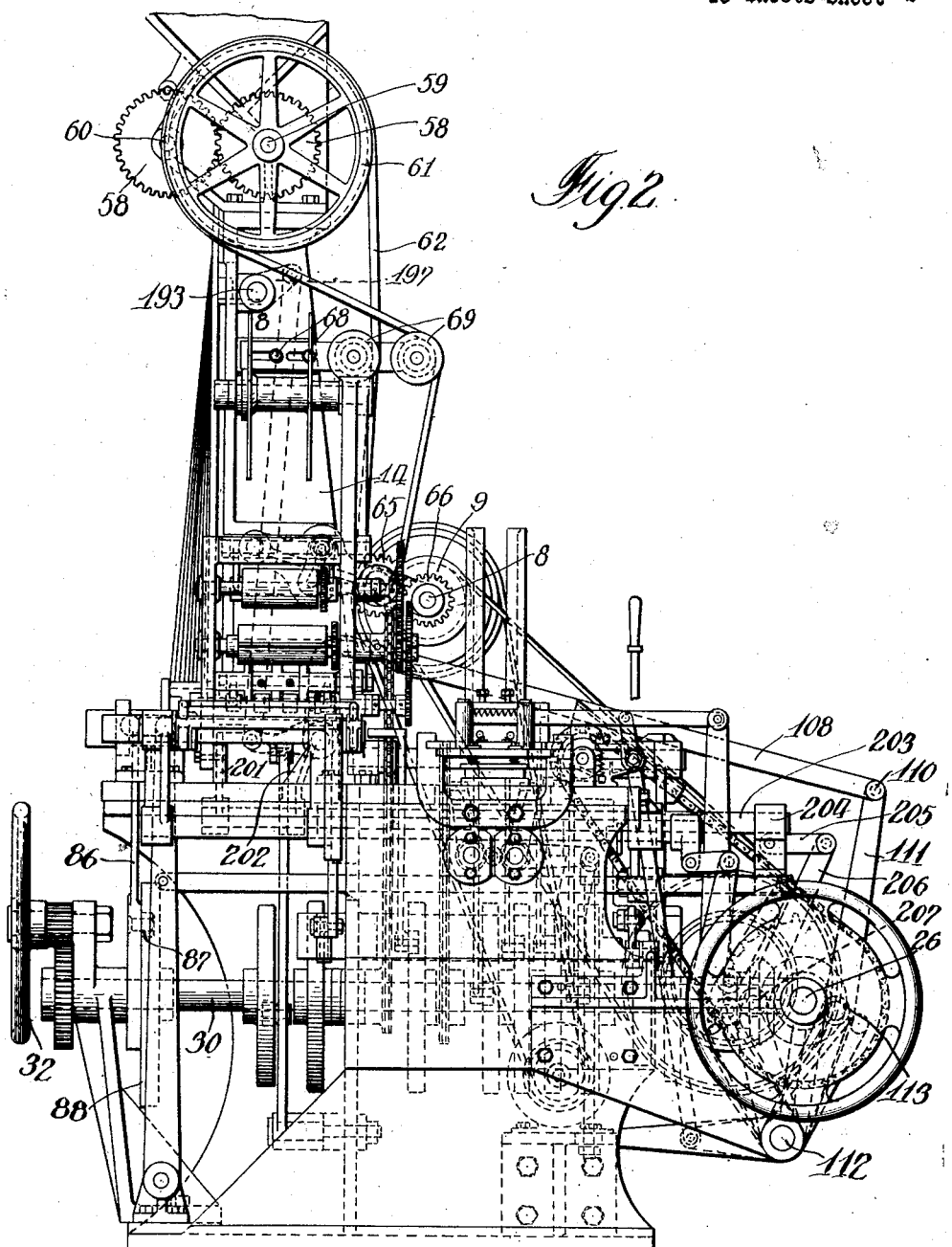

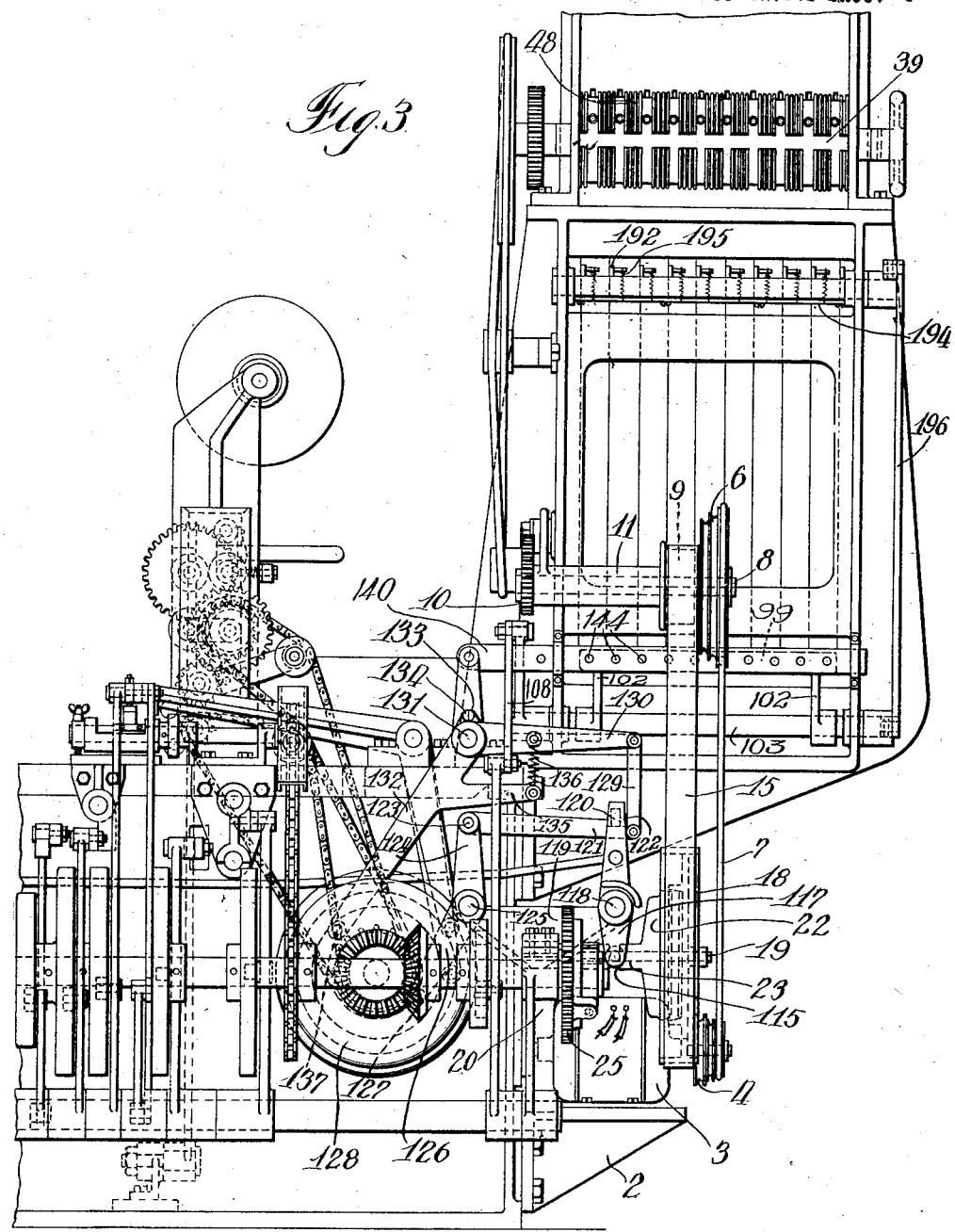

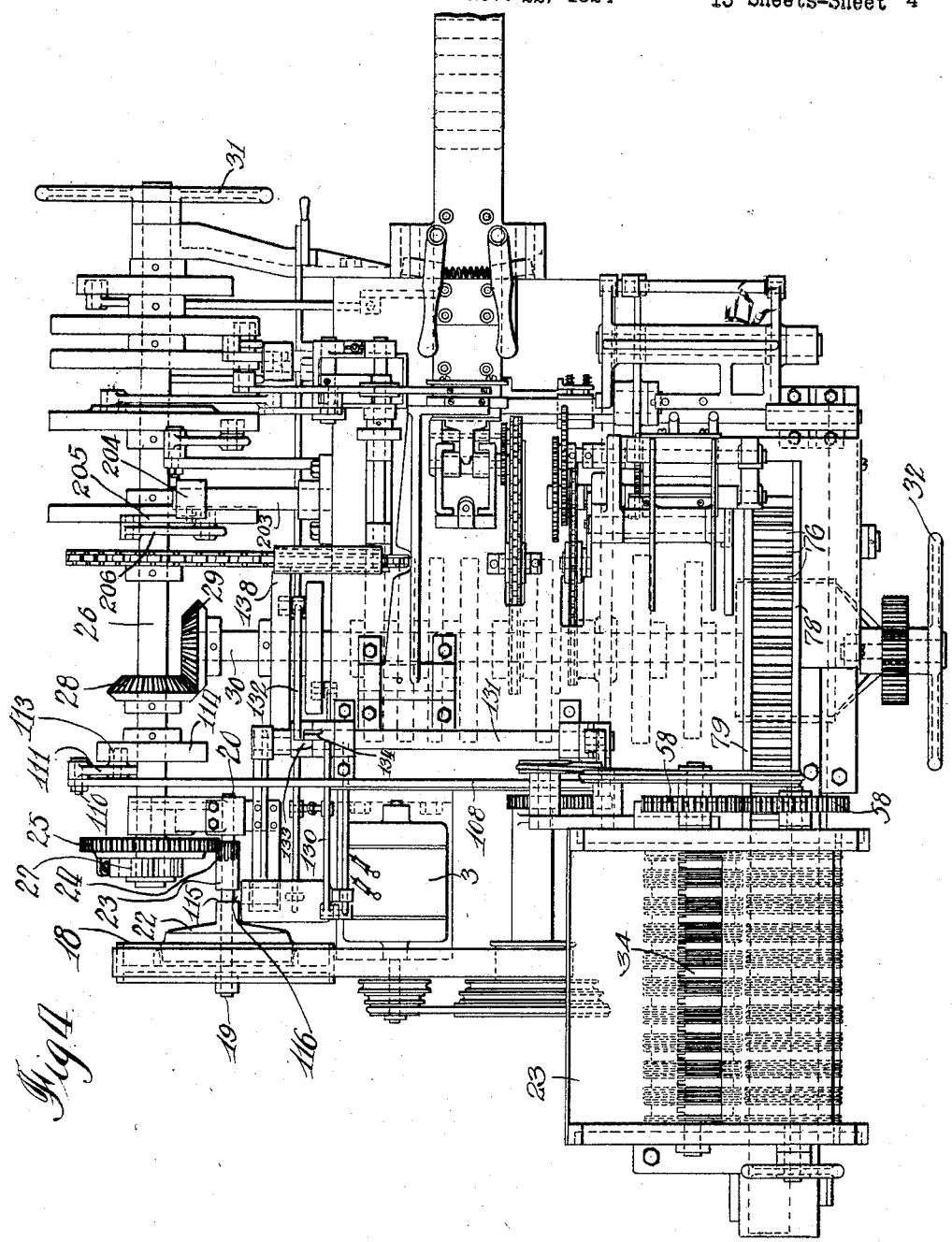

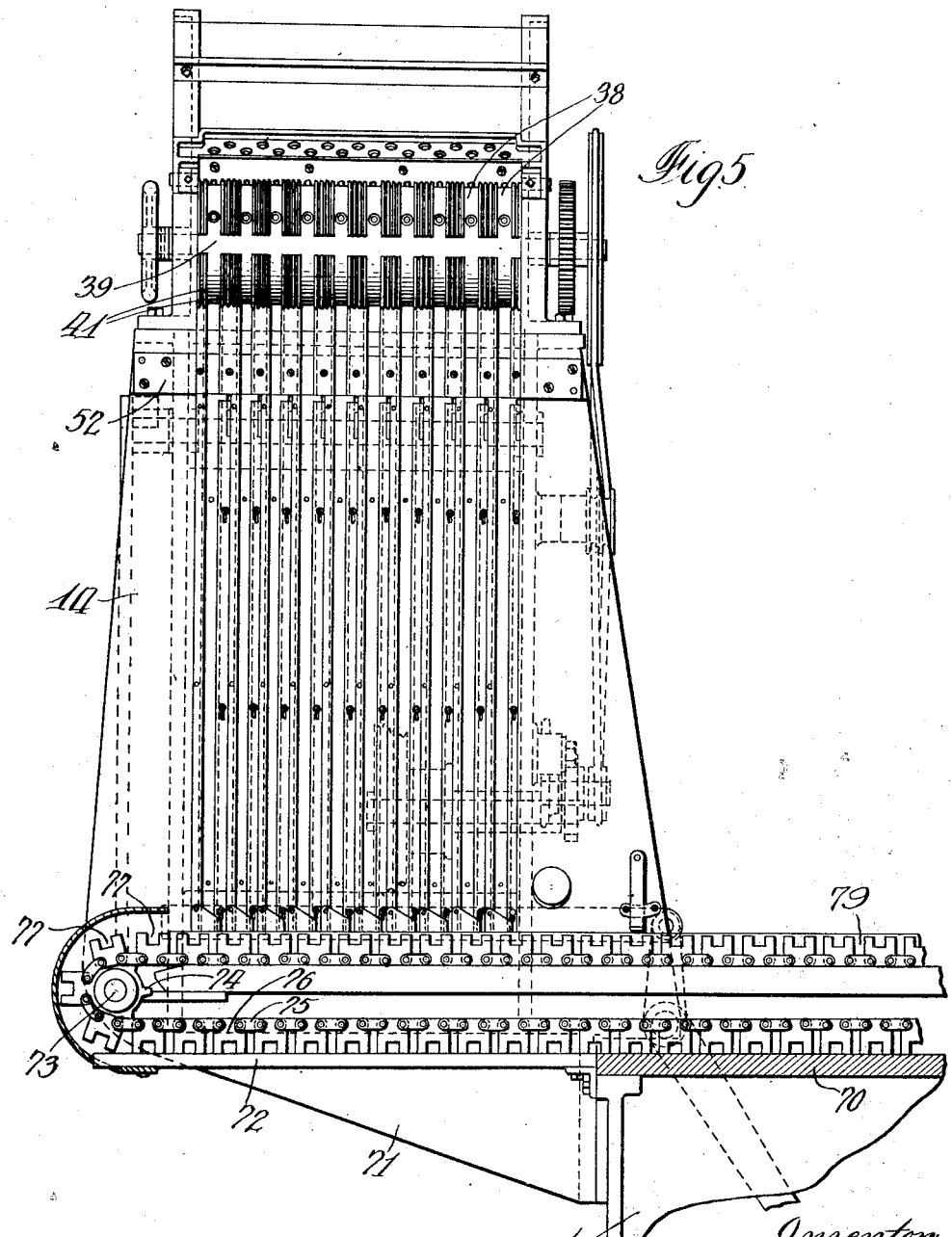

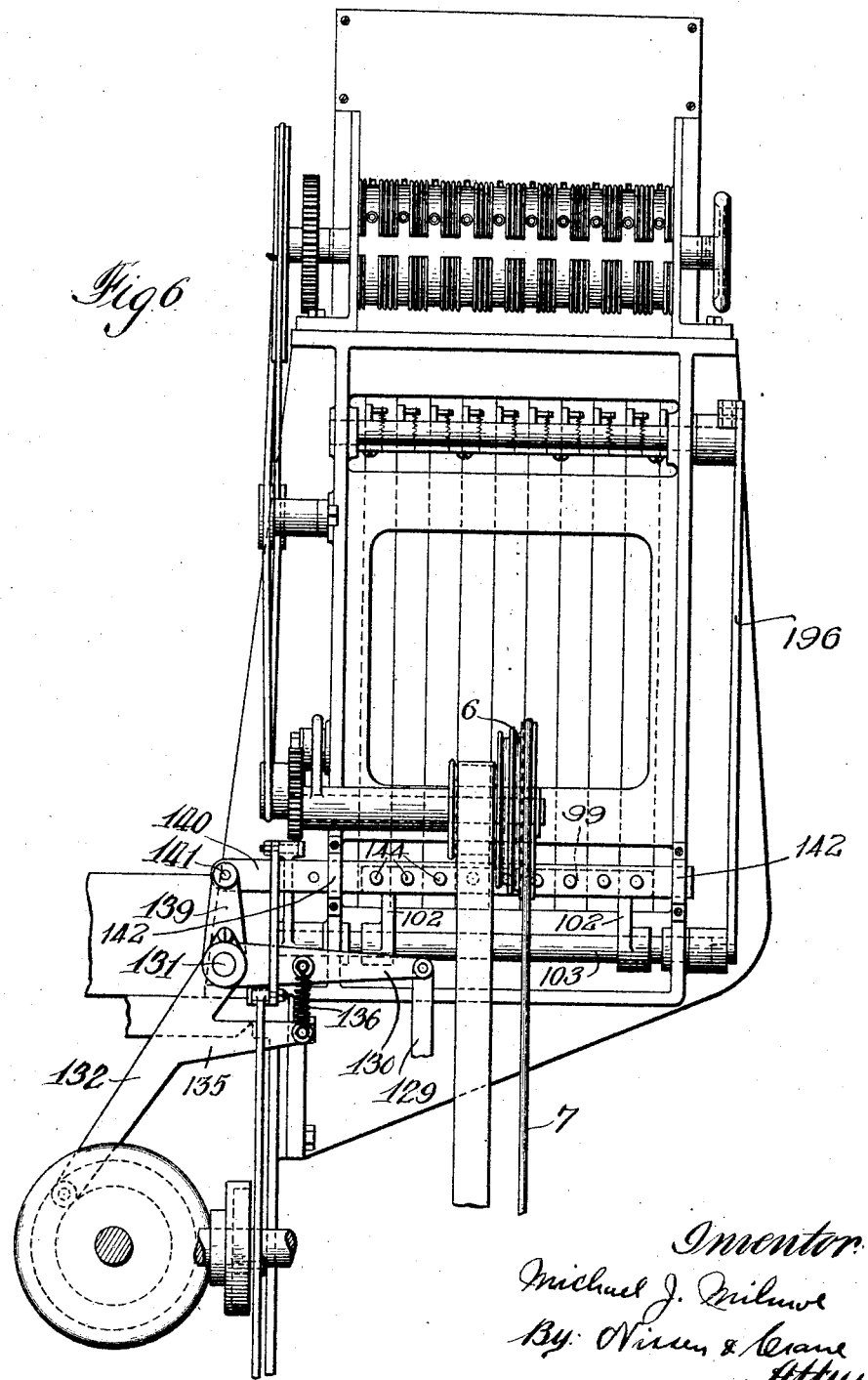

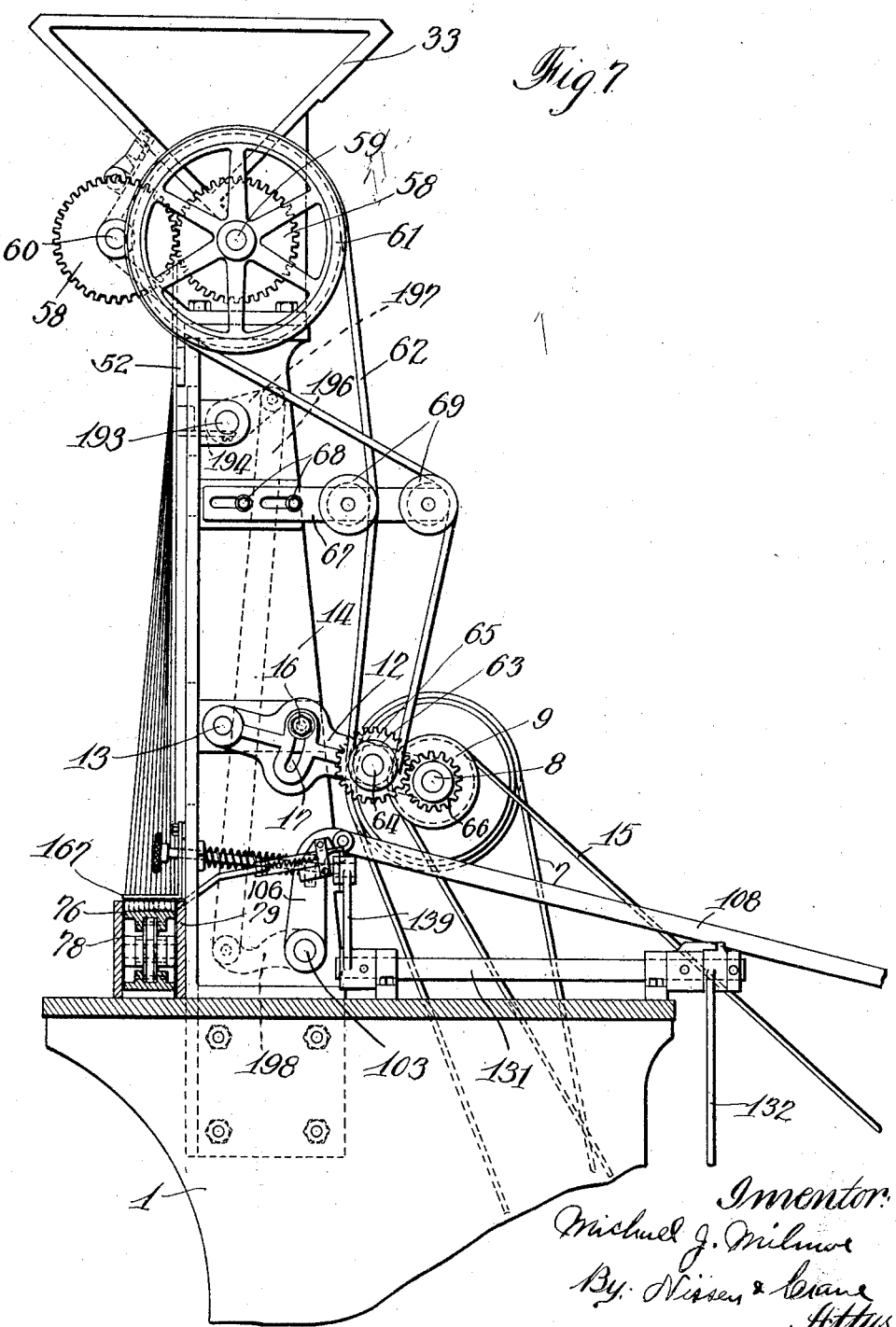

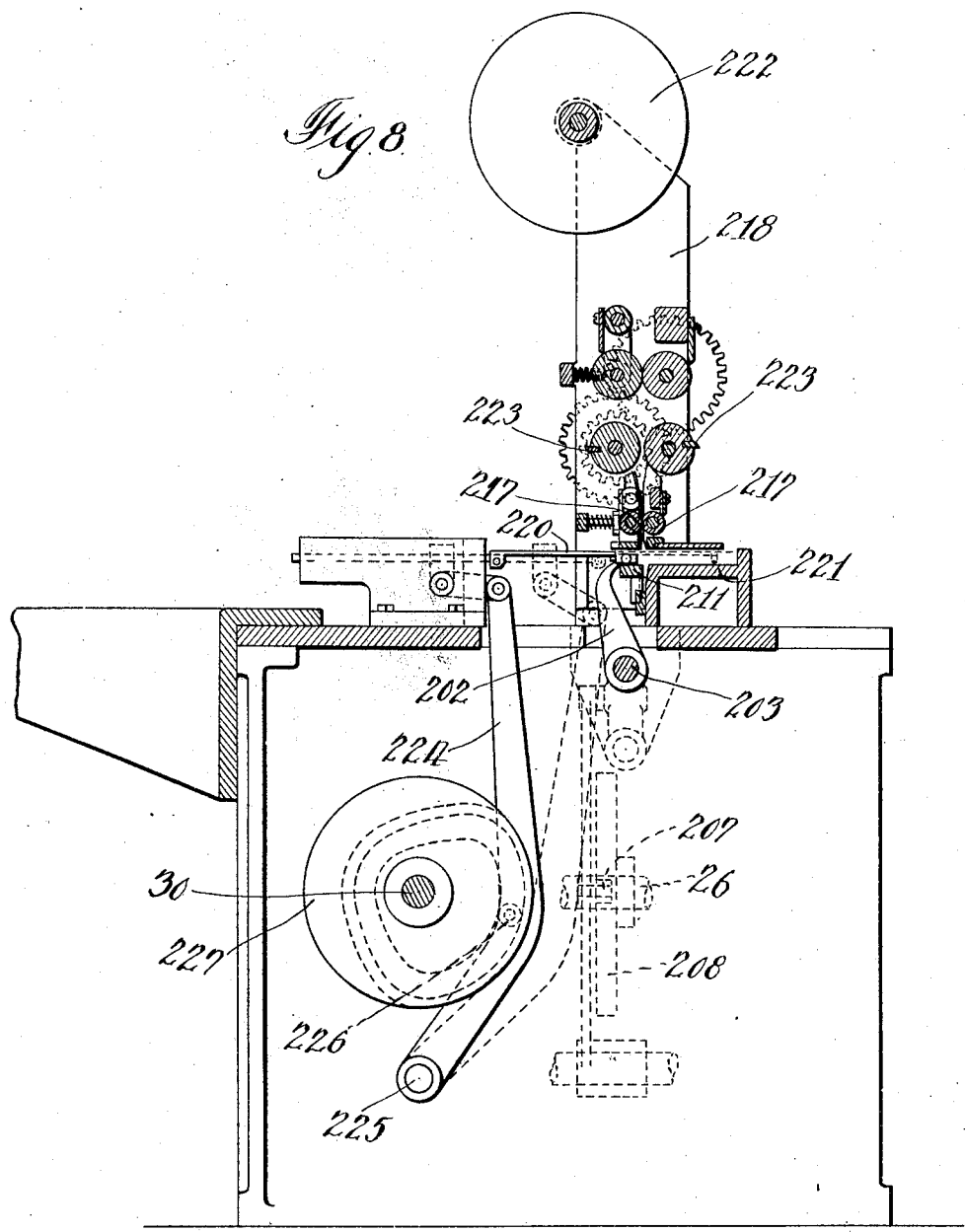

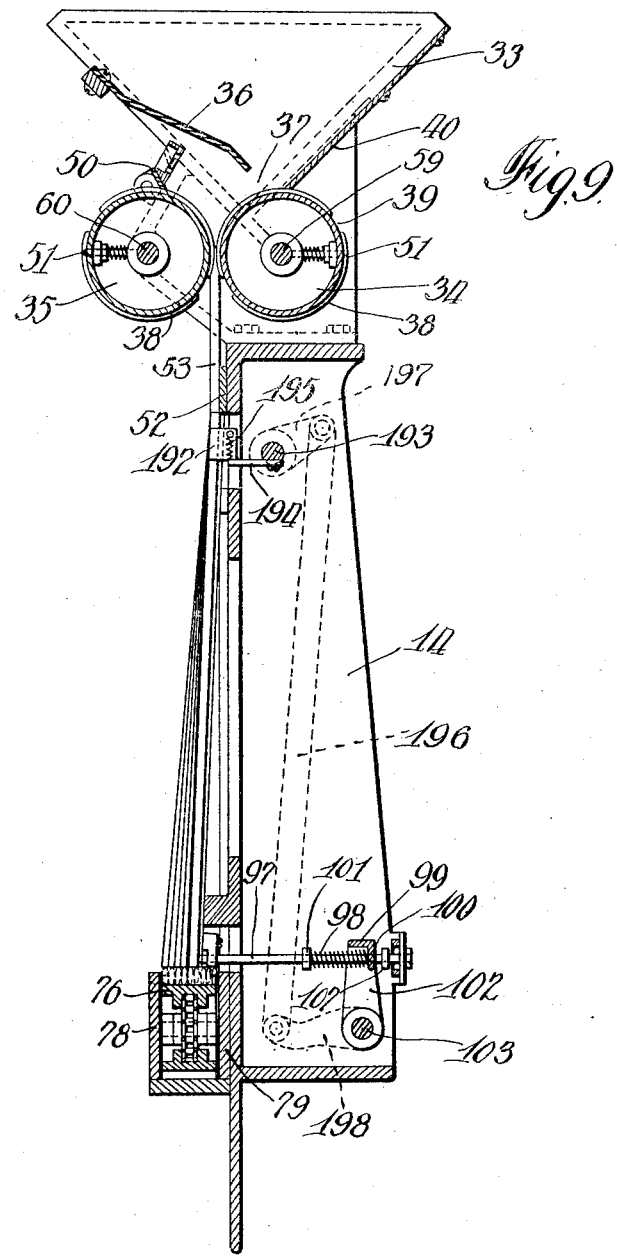

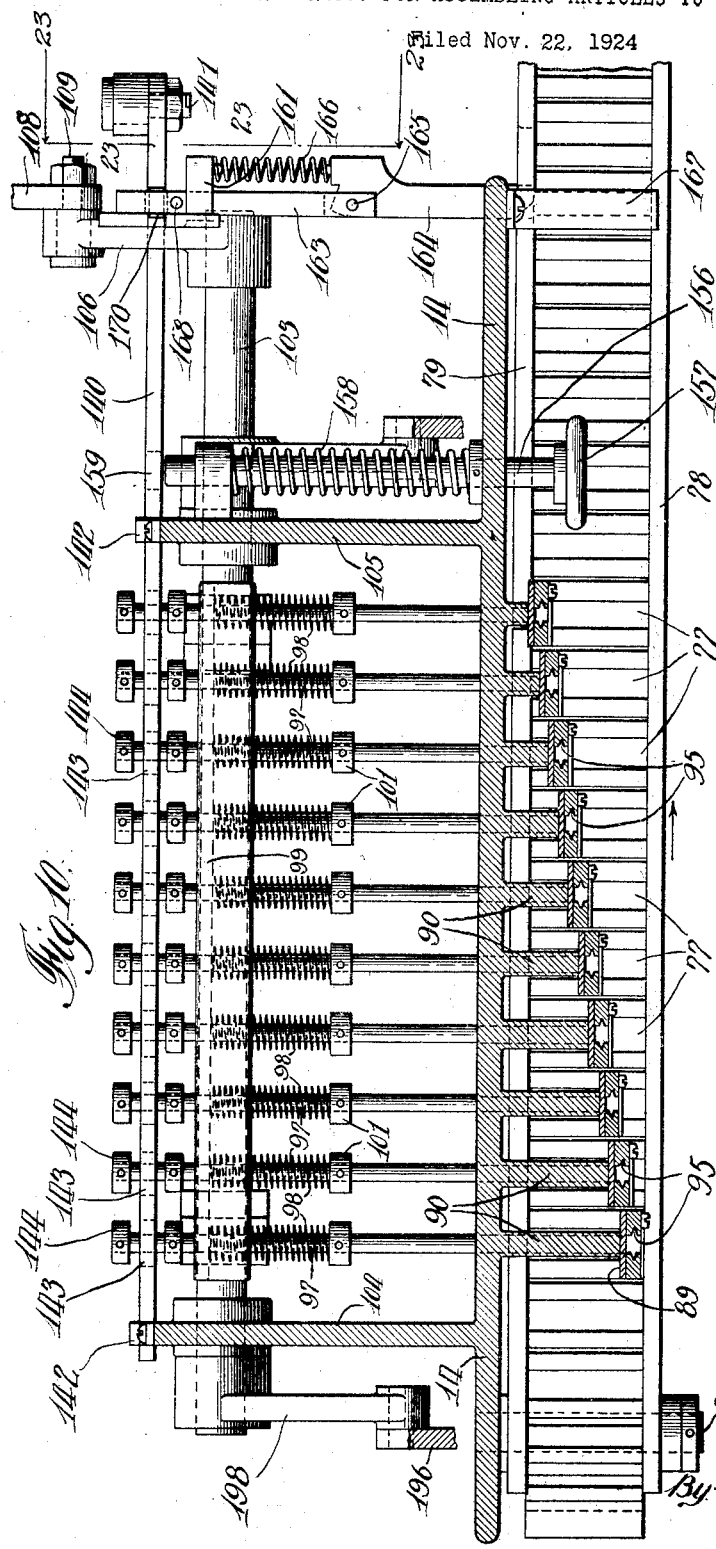

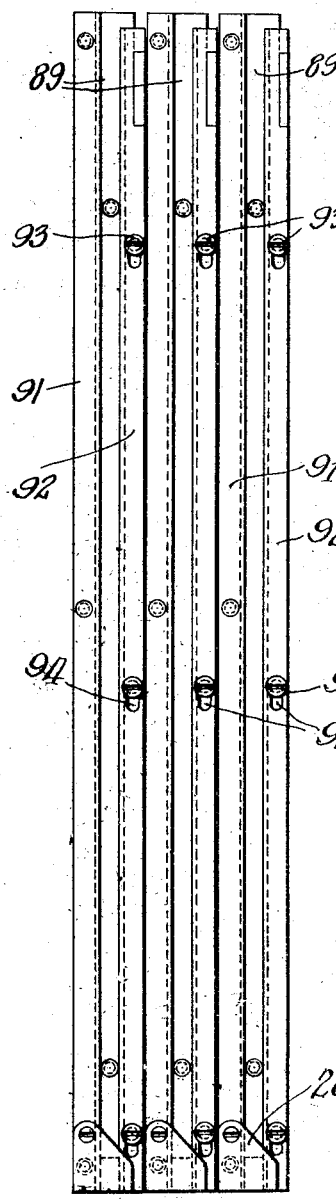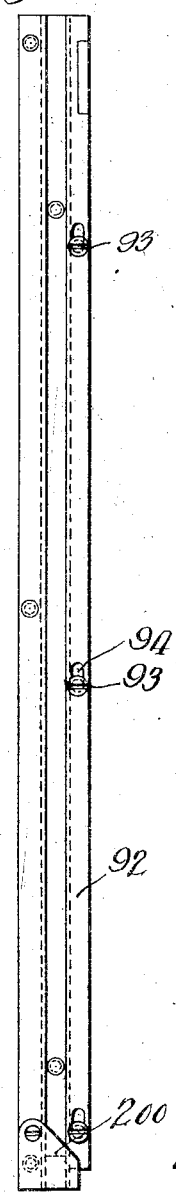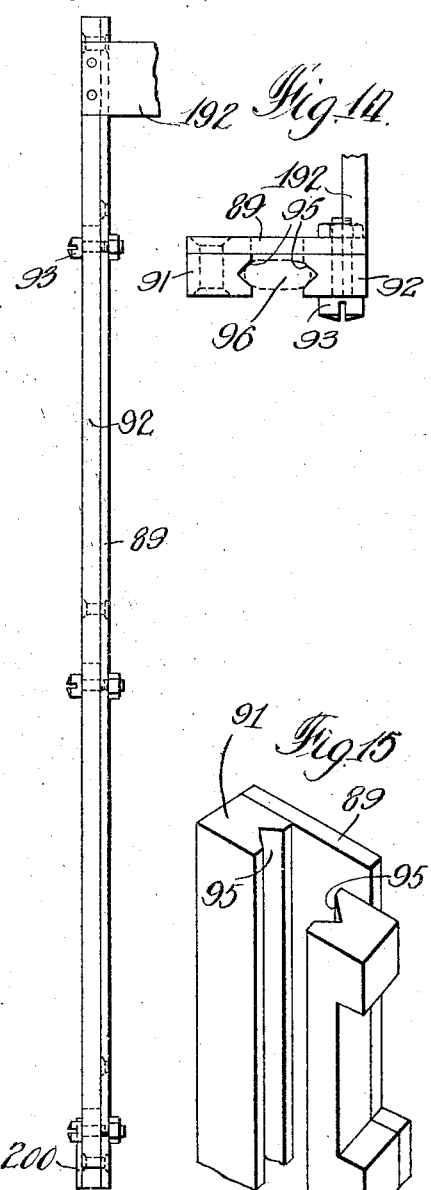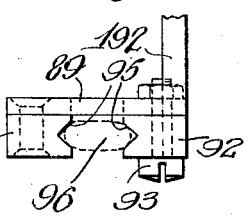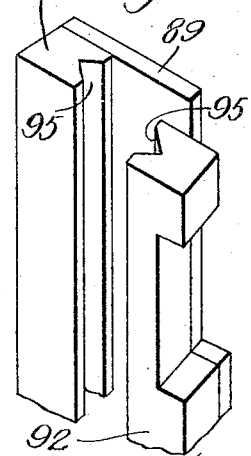

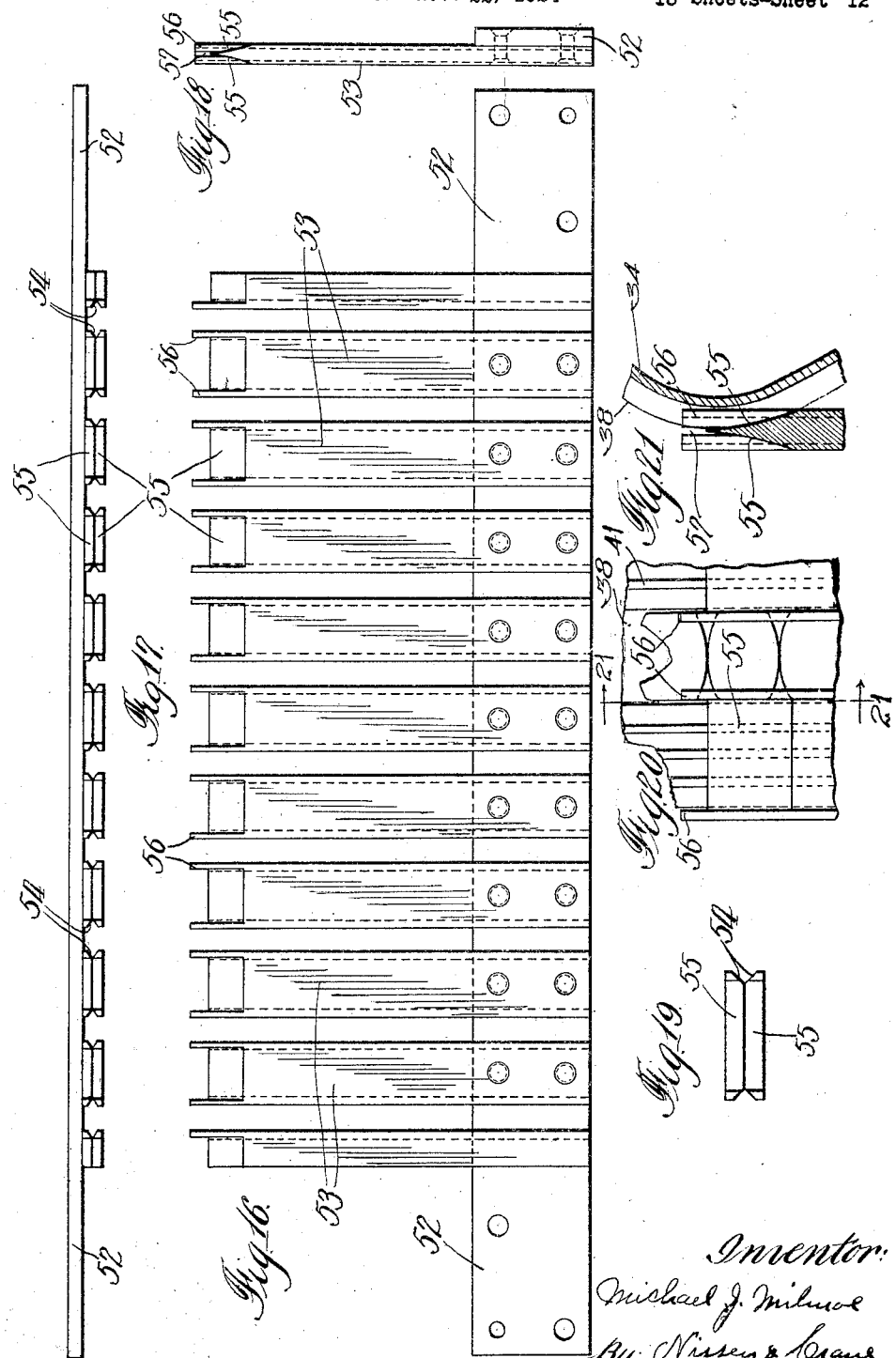

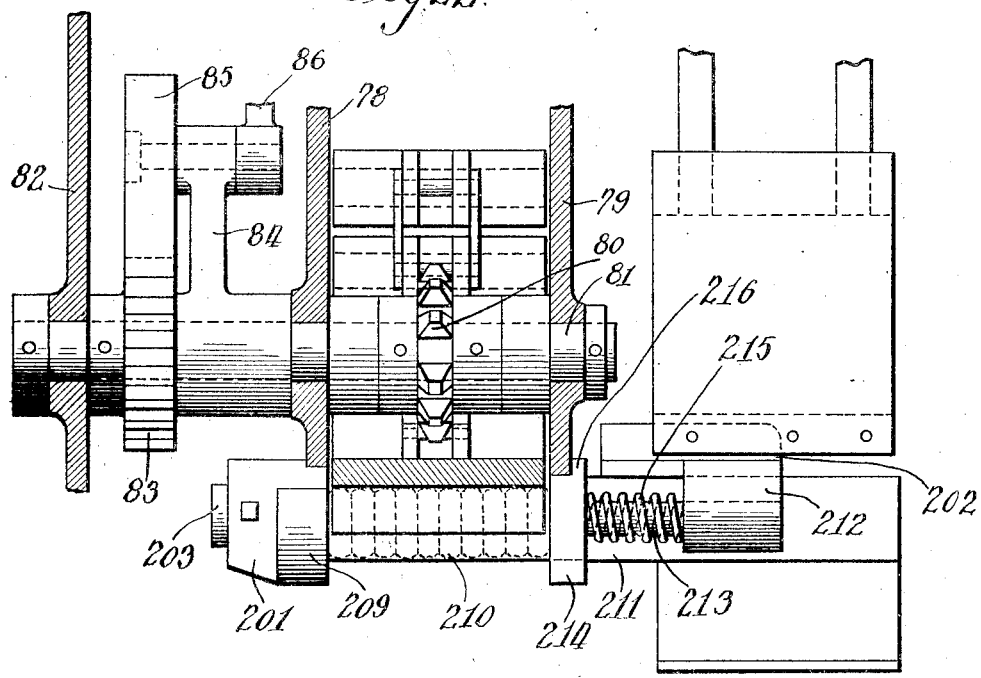
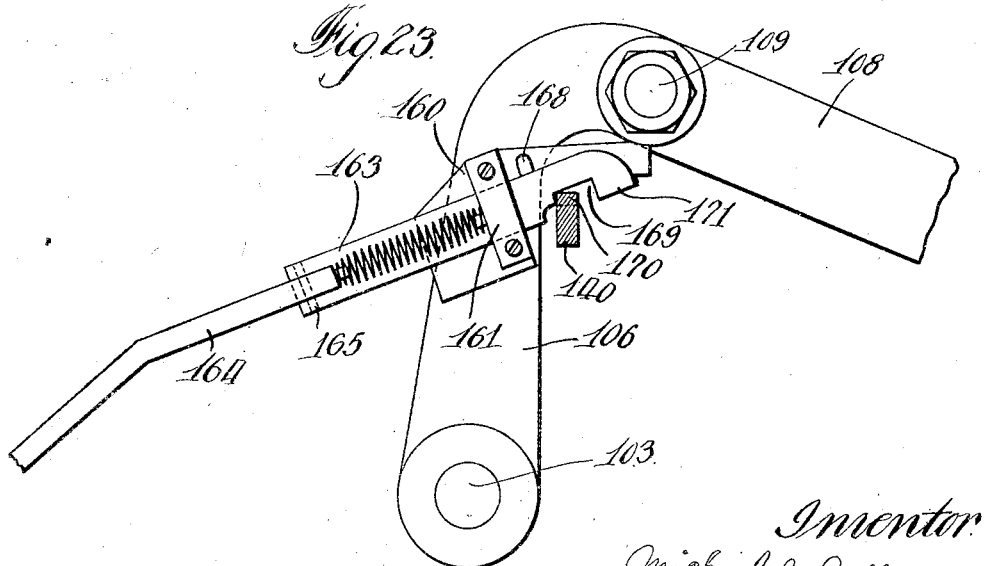

1,628,596

UNITED STATES PATENT OFFICE.

MICHAEL J. MILMOE, OF CHICAGO, ILLINOIS, ASSIGNOR TO F. B. REDINGTON COMPANY, OF CHICAGO, ILLINOIS, A CORPORATION OF ILLINOIS.

APPARATUS FOR ASSEMBLING ARTICLES TO BE PACKED.

Application filed November 22, 1924. Serial No. 751,666.

This invention relates to a process of assembling a number of articles in proper relation to be arranged in a package and the machine for carrying out the process, and has for its object the provision of a method and apparatus for packing small articles which shall be economical and efficient and by which the articles may be poured loosely into a hopper and automatically assembled and presented to packing mechanism.

The invention is exemplified in the combination and arrangement of parts shown in the accompanying drawings and described in the following specification and in the process explained in connection therewith, and it is more particularly pointed out in the appended claims.

In the drawings,—

Fig. 1 is a front elevation of a machine embodying the present invention.

Fig. 2 is a side elevation of the machine shown in Fig. 1.

Fig. 3 is a rear elevation of the machine shown in Fig. 1.

Fig. 4 is a top plan view of the machine shown in Fig. 3.

Fig. 5 is a front elevation of the hopper, showing the arrangement of the chutes and runways for feeding the articles to a conveyor having assembling buckets thereon.

Fig. 6 is a rear view of the mechanism shown in Fig. 5.

Fig. 7 is a side view of the mechanism shown in Fig. 5, with the assembling conveyor in section.

Fig. 8 is a vertical sectional view showing the mechanism for transferring the assembled articles to the wrapping apparatus.

Fig. 9 is a vertical sectional view through the hopper and chutes.

Fig. 10 is a horizontal sectional view through the discharge chutes from the hopper.

Fig. 11 is a front elevation of a number of discharge chutes.

Fig. 12 is a front elevation of one of the chutes with a part thereof in a changed position.

Fig. 13 is a side view of the chute shown in Fig. 12.

Fig. 14 is a top plan view of the chute shown in Fig. 12.

Fig. 15 is a perspective view of the top portion of the chute shown in Fig. 12.

Fig. 16 is a front elevation of the guides for receiving the articles from the hopper.

Fig. 17 is a top plan view of the guides shown in Fig. 16.

Fig. 18 is an end elevation of the guides shown in Fig. 16.

Fig. 19 is a top plan view of one of the guides.

Fig. 20 is a side elevation of the top of one of the guides.

Fig. 21 is a section on line 21—21 of Fig. 20.

Fig. 22 is a horizontal section substantially on line 22—22 of Fig. 1.

Fig. 23 is a vertical section substantially on line 23—23 of Fig. 10.

In my prior Patent No. 1,384,844 I have shown a machine for feeding confections in the form of briquets or lozenges and for separating a predetermined number of the confections from a continuous series and feeding the number separated into a package.

The embodiment of the present invention shown in the drawings is arranged to assemble confections similar to those shown in connection with my prior patent, but a different method of assembling the briquets is employed. As shown in Fig. 1 the mechanism of the present invention is mounted on a supporting frame 1, having a bracket 2 secured to one side thereof upon which a driving motor 3 is mounted. The motor 3 is provided with a series of pulleys 4 of different sizes which drive a corresponding series of pulleys 6 through the medium of a belt 7. As shown in Fig. 3, the pulleys 6 are secured to a shaft 8 having a flat pulley 9 secured thereto and also carrying a gear 10. The shaft 8 is journaled in a sleeve 11 mounted on a bracket 12, which is pivoted at 13 on a frame member 14 projecting upwardly from the main frame 1. The bracket 12 may be swung about its pivot 13 to regulate the tension of the belt 7 and also of a flat belt 15 which passes about the pulley 9. The bracket 12 is held in its adjusted position by a screw 16, which passes through a slot 17 in the bracket and is threaded into the frame 14. The belt 15 extends downwardly about a pulley 18 loosely mounted on a shaft 19 fixed to a bracket 20 on the main frame 1. A clutch member 22 is formed on a sleeve 23 slidably mounted on the shaft 19 and movable into and out of clutching relation with the pulley 18. Gear teeth 24 are formed on the end of the sleeve 23 and mesh with a gear 25 mounted on the main drive shaft 26 of the machine. The gear wheel 25 is held to the shaft 26 by means of a safety drive 27, which holds the gear and shaft together for rotation in unison with one another under the ordinary driving load but which permits disconnection of the gear and shaft in case the mechanism driven by the shaft is blocked. The shaft 26 carries a beveled gear 28 which meshes with a beveled gear 29 on a second drive shaft 30 extending from front to rear of the machine at right angles to the drive shaft 26. The drive shaft 26 is provided with a hand wheel 31 by means of which the machine may be moved by hand for purposes of adjustment or inspection, and a second hand wheel 32 is geared to the shaft 30 for a like purpose.

Mounted at the top of the frame 14 is a hopper 33, into which the articles to be assembled and packed are loosely deposited. The machine illustrated in the drawings is designed for rectangular shaped briquets or lozenges consisting of a chewing gum center having a comparatively hard candy coating. The corners of the briquet are rounded. It will be understood, of course, that the parts of the machine may be proportioned to accommodate articles of various sizes and shapes. As shown in Fig. 9, the hopper 33 is open at its bottom and a pair of drums 34 and 35 are journaled to rotate beneath the opening at the bottom of the hopper. A plate 36 is disposed at one side of the hopper to provide a throat 37 above the roller 34. The drums 34 and 35 have circumferential grooves 38 formed therein and arranged in spaced relation along the drums as shown in Fig. 5. The grooves in the two drums are arranged to register with one another to provide openings through which the briquets may be fed by gravity, the passage thus formed being of the correct size to accommodate a single briquet at one time. The drums 34 and 35 are driven in opposite directions so that the inner adjacent faces of both drums move upwardly. This direction of movement prevents the rotation of the drums from wedging the briquets between the surfaces adjacent the grooves and at the same time continually agitates the briquets to permit them to enter the passages formed by the circumferential grooves. To assist in the agitation each drum is provided with longitudinally extending grooves 39. Since these longitudinally extending grooves intercept the lines of material between the peripheral grooves 38, it will be apparent that briquets lodged in the groove 39 between the grooves 38 might be carried upwardly against the wall 40 of the hopper and since a portion of the briquet would be below the edge of the wall there might be danger of crushing the briquet against the wall. To avoid this, the series of narrow grooves 41 is formed in the surface of the drums between the grooves 38, and the wall 40 is provided with tongues projecting into the grooves 41. Since these tongues extend inward to the bottoms of the grooves 41 and their inner ends register with the bottoms of the grooves 39 they will lift any briquets from the grooves 39 and prevent them from being crushed against the wall 40. A stripper plate 50 is provided for the roller 35 having tongues thereon similar to the tongues on the wall 40. The drums 34 and 35 may also be provided with spring plungers 51 which assist in agitating the briquets within the hopper 33 and which pass through openings provided in the stripper plate 50 in the wall 40 for this purpose.

As shown in Figs. 5 and 9, a bar 52 is secured to the frame member 14 and extends transversely thereof below the drums 34 and 35. A series of bars 53 are attached to the bar 52 and extend upwardly therefrom in parallel spaced relation, as shown in Figs. 16 and 17. The side edges of the bars 53 are provided with vertical grooves 54, shown in Figs 17 and 19, and the bars are arranged in proper spaced relation to one another so that a briquet will enter between the bars 53 and will be held in place between the bars by projection of its edges into the grooves 54. The bars 53 are so arranged between the drums 34 and 35 that the spaces between the bars register with the openings formed by the peripheral grooves 38 in the drum. In this way the briquets will pass from the hopper 33 and are guided into the runways formed between the upright bars 53. The tops of the bars 53 are beveled as shown at 55, Fig. 21, the beveled surfaces being shaped to conform to the periphery of the outermost portions of the drums 34 and 35. Tongues 56 extend upwardly at each side of the beveled portions 55 and project into the grooves 38 to prevent the briquets from escaping laterally or wedging as they emerge from the hopper. The grooves 54 are of sufficient depth to cut through the tongues 56 as shown at 57 in Fig. 21. This leaves the channel between the tongues on adjacent plates the full width of the groove 38 so that the tongues projecting into the groove 38 will not interfere with the passage of the briquets into the channel. The drums 34 and 35 are provided with intermeshing gears 58, Fig. 7, the gears being secured to shafts 59 and 60, respectively, which carry the drums 34 and 35. A pulley 61 is secured to the shaft 59 and receives a belt 62 driven by a pulley 63 mounted on the stud shaft 64 carried by the bracket 12. A gear 65 is secured to the pulley 63 and meshes with a gear 66 on the shaft 8. A bracket 67 is adjustably mounted by screws 68 on the frame 14 and carries idlers 69 over which the belt 62 passes. Bracket 67 may be adjusted on the frame 14 to regulate the tension of the belt 62.

The frame 1, as shown in Fig. 5, is provided with a table top 70 and a bracket 71 extends laterally from the frame 1 and is provided with a plate 72, the face of which registers with the top of the table 70. The bracket 71 assists in supporting the frame 14 and the frame at the outer end of the bracket 71 has a stud shaft 73 fixed thereto, as shown in Figs. 5 and 10. A sprocket wheel 74 is journaled on the stud shaft 73 and a sprocket chain 75 is guided over the wheel 74. Alternate links in the sprocket chain 75 comprise blocks 76 having grooves 77 formed in their outer faces transversely of the chain 75, the grooves constituting receptacles or buckets for receiving the briquets. The end of the chain 75 opposite the sprocket wheel 74 passes over a second sprocket wheel 80 secured on the shaft 81 journaled in the side plates 78 and 79, as shown in Figs. 21 and 22. The shaft 81 extends forwardly through the side plates 78 and has its outer end journaled in the cover plate 82. Between the side plate 78 and cover plate 82 a ratchet wheel 83 is secured to the shaft 81 and an arm 84 is disposed adjacent the ratchet wheel 83 and is freely mounted on the shaft 81. The arm 84 carries a pawl 85, which engages the ratchet wheel 83 and the arm is oscillated by a link 86, which is bifurcated at its lower end and is slidably mounted on the drive shaft 30, as shown in Figs. 1 and 2. The link 86 is oscillated by a cam roller 87, which operates in a groove formed in a cam 88 secured to the shaft 30. By this mechanism periodic movement is imparted to the conveyor 75, each movement being equal to the space between centers of the buckets 77. The conveyor is given one movement for each revolution of the shaft 30.

Slideways are provided to guide the briquets from between the bars 53 into the buckets 76. These slideways are formed by plates 89 mounted on ribs 90 extending forwardly from the frame plate 14, as shown in Fig. 10. Each plate 89 as shown in Figs. 11 to 15, inclusive, has a guide strip 91 fixed to one edge thereof and a second guide strip 92 slidably mounted at the opposite edge thereof and held in position by screws 93 passing through slots 94 so as to permit slight vertical movement of the strip 92. The adjacent edges of the strips 91 and 92 have grooves 95 formed therein to form guides for the briquets, one of which is shown in broken lines at 96 in Fig. 14. The outer faces of the ribs 90 are inclined at progressively different angles. The tops of the ribs have their outer faces arranged in alignment so that the slideways formed by the grooves 95 register at their upper ends with the lower ends of the slideways between the bars 53. The lower ends of the slideways formed by the grooves 95 are arranged in offset relation over the buckets 77, as shown in Fig. 10. Each slideway is positioned outwardly beyond the next adjacent slideway by an amount equal to the thickness of one briquet.

The driving mechanism for the conveyor chain 75 is so adjusted relative to the other parts of the machine that the conveyor is brought to rest after each movement with the buckets thereon in registration with the lower ends of the slideways 95. A series of plungers 97 have their forward ends projecting through the plates 89 in position to bear against the lowermost briquet in each guideway 95. The plungers 97 are held against the briquets by springs 98 and are periodically released to permit the column of briquets in the slideway 95 to drop downwardly by gravity. The lower ends of the slideways 95 are disposed above the bottoms of the buckets 77 a sufficient distance to clear the upper edges of the buckets. The plungers 97 are released only momentarily, and after the columns of briquets have moved downwardly to deposit a briquet from the lower end of each column the plungers 97 are again pressed forwardly by their springs 98 to engage the lowermost briquet in each column to prevent further downward movement during the next forward movement of the buckets 77. After each movement of the conveyor a briquet is deposited in each of the buckets 77. As a single bucket is moved to the right as viewed in Fig. 5 across the battery of slideways the first slideway deposits a briquet at the forward end of the bucket. The conveyor is then moved one step, after which the second slideway deposits a briquet adjacent the briquet deposited by the first slideway. At each movement of the conveyor an additional briquet is deposited in each of the buckets registering with the slideways, so that as each bucket emerges from beneath the series of slideways it is filled with a continuous row of briquets, there being one briquet in the bucket for each of the slideways. In the present embodiment of the invention ten slideways are shown and the buckets are made of the proper length to contain ten briquets. It will thus be seen that but a single briquet is deposited in each bucket at one time, but that for each movement of the conveyor a completely filled bucket is brought from beneath the battery of slideways.

The plungers 97 are operated by a pressure bar 99, which is provided with a vertical web 100 having perforations through which the plungers 97 pass, the springs 98 bearing against the web 100 and against collars 101 for exerting the resilient pressure to hold the ends of the plungers against the briquets. The pressure bar 99 is carried by arms 102 secured to the shaft 103, which is journaled in webs 104 and 105 on the frame 14. The shaft 103 is provided at one end with a rocker arm 106 by means of which the shaft 103 is oscillated. When the shaft 103 is moved in a clockwise direction as viewed in Fig. 9, the web 101 will engage collars 107 on the plungers 97 and thus move the plungers 97 rearwardly and release the briquets in the slideways. When the shaft returns in a counter-clockwise direction the springs 98 will be again compressed to force the plungers 97 forwardly against the briquets in the slideways. The oscillation of the arm 106 is accomplished by a link 108 pivoted at 109 to the end of the arm 106. The link 108 extends rearwardly as shown in Figs. 2 and 4, and is pivotally connected at 110 to the upper end of a lever 111. The lower end of the lever 111 is journaled on a shaft 112 and between the ends a cam roller 113 is mounted on the lever 111 and engages a groove in a cam 114 carried by the shaft 26. Each revolution of the shaft 26 produces an oscillation of the lever 111 and consequently releases the plungers 97. Since the shaft 26 and the shaft 30 rotate at the same speed, there will be one oscillation of the pressure bar 99 for each forward movement of the conveyor chain 75 and the buckets 77.

If for any reason a slideway 95 fails to deliver a briquet at any operation of the machine, it is desirable that the machine shall be stopped in order that the shortage may be supplied to the bucket which failed to receive its proper quota and in order that the difficulty which caused the failure may be removed. To accomplish this result each of the plungers 97 has associated therewith means for disconnecting the clutch 22 by which the pulley wheel 18 is held to the sleeve 23. It will be seen in Figs. 3 and 4 that the sleeve 23 is provided with a peripheral groove 115, which engages a pin 116 on the lower end of a clutch lever 117 pivotally mounted at 118 on a bracket 119 carried by the frame 1. The upper end of the lever 117 is provided with a rectangular pin or projection 120. The projection 120 is disposed above a link 121 having a notch 122 therein and the projection 120 normally engages the notch 122. The link 121 is pivoted at 123 to an arm 124, the arm being secured to a shaft 125 provided with a downwardly extending arm 126 having a roller 127 which travels in a groove formed in a cam 128 on shaft 30. By this mechanism the link 121 is moved to the right as viewed in Fig. 3 at each rotation of the shaft 30, and it will be apparent that should the link 121 remain in position with the notch 122 in registration with the pin 120 the movement of the link 121 would rotate the clutch lever about its pivot 118 and disengage the clutch 122, thus stopping the machine. The link 121 is supported by an upright link 129 pivoted at its upper end to an arm 130 secured to a shaft 131. A downwardly extending arm 132 is loosely mounted on the shaft 131 and is provided with a laterally extending lug 133, which engages a complementary lug 134 fixed to the arm 130. The arm 132 is provided with a branch arm 135, and a spring 136 connects the branch arm 135 with the lever 130. The tension of the spring normally holds the lugs 133 and 134 in contact with one another. The arm 132 is given an oscillation at each rotation of the shaft 30 by means of a cam roller 137, which engages a groove in cam 138 on shaft 30. When the arm 132 moves in a clockwise direction as viewed in Fig. 3, it will exert tension on the spring 132, tending to rotate the arm 130 and shaft 131 in the same direction, which rotation will take place if the shaft 131 is free to move. Such rotation during normal operation lowers the link 121 at the time it is moved by lever 124 to free the notch 122 from the lug 120. At the end of the shaft 131 adjacent the support 14 the shaft is provided with an upright arm 139, as shown in Figs. 6 and 7. A control bar 140 is pivotally connected at 141 to the upper end of the link 139, as shown best in Figs. 6 and 10. The control bar 140 is supported to slide in brackets 142 and is provided with openings 143 through which the plungers 97 extend. Each plunger 97 is provided at its end with a head 144 of a size to pass easily into the openings 143. The opening 143 is sufficient to permit oscillation of the bar 140 imparted thereto by the arm 139 whenever the plungers are in the position shown in Fig. 10, so that the heads 144 are in the rear of the control bar 140. If one of the slideways 55 should fail to receive a briquet at its lower end for any cause such as exhaustion of the supply in the hopper or clogging of the runways, the corresponding plunger would be free to move forwardly a sufficient distance to bring its head 144 into the opening 143 in the control bar 140. In this way oscillation of the control bar 140 would be blocked so that at the next movement of the shaft 131 would be held from rotation and movement of the lever arm 132 would merely serve to stretch the spring 136 and arm 130 and suspension link 129 would remain stationary. The cams 128 and 138 are so formed relative to one another that in the normal action of the machine the link 121 is moved to the right in Fig. 3 at the time that the arm 132 is held at its outermost position. This will permit the link 121 to be dropped downwardly to disengage the parts 120 and 122 during the oscillation of the link 121 when there is no obstruction to rotation of the shaft 131. When the shaft is held against rotation, however, as by the heads 144 interfering with the oscillation of the control bar 140, the link 121 will be held in its uppermost position with the parts 120 and 122 in engagement with one another during oscillation of the arm 124. This, as explained before, will disengage the clutch 122 and stop the machine. It will thus be seen that if for any reason the stream of briquets in the slideways 155 is interfered with, the plunger 97 which registers with the particular slideway in trouble will automatically detect the absence of the normal supply and cause the operation of the machine to cease.

Means is also provided for manually stopping the machine through the medium of the slide bar 140, as shown in Fig. 10. This consists of a plunger 156 having a finger button 157 thereon and having a spring 158 to hold it in retracted position. The plunger 156 registers with an opening 159 in the control slide bar 140, so that if the operator presses inwardly on the button 157 the slide 140 will be held against movement and the clutch will be operated in the manner already described to stop the machine.

Means is also provided for automatically stopping the machine in case one of the buckets 77 is not completely filled. This provides an additional check on the operation of the machine, supplementing the check produced by the plungers 97. The mechanism for automatically stopping the machine in case a bucket 77 is not properly filled is shown in Figs. 7, 10 and 23. Secured to the arm 106 which oscillates the pressure plate 99 is a plate 160 having a yoke 161 attached thereto, providing a slideway for a bar 163. The bar 163 has an extension 164 pivoted thereto at 165, and the end of the extension 164 projects through a slot in the side plate 79 of the conveyor guideway. A spring 166 bears against the extension 164 and normally urges the end of the extension toward the conveyor. Each movement of the conveyor brings one of the buckets into registration with the end of the extension 164, so that the extension finger yieldingly presses against the rearmost briquet in the bucket. A plate 167 is disposed above the buckets while in registration with the extension finger 164 to prevent the briquets from buckling upwardly under the pressure exerted by the finger. A pin 168 projects from the slide bar 163 in position to engage the yoke 161 so that each time the arm 106 is rocked to release the pressure on the plungers 97 the same movement will release the pressure on the extension arm 164 so that the briquets will be free from pressure during the forward movement of the conveyor. The pivotal connection 165 permits the arm 164 to swing in the direction of the movement of the conveyor to prevent any interference in case the extension finger is projected into one of the buckets at the time that the conveyor moves forward. The lower edge of the slide bar 163 is provided with a notch 169, which registers with a notch 170 formed in the upper face of the bar 140. When the finger 164 strikes the briquets of a full bucket the forward movement of the finger will be arrested with the notch 169 in registration with the upper face of the bar 140. In this position the slide bar 163 will not interfere with the movement of the control bar 140. If, however, the number of briquets in a bucket 77 is short the extension finger 164 and the slide bar 163 will move forwardly when the arm 106 is rocked until the notch 169 moves out of registration with the notch 170 and the projection 171 at the end of the bar 163 will move into the notch 170. In this position the control bar 140 will be arrested and the operating clutch will be thrown out and the machine stopped in a manner similar to that which occurs when the control bar is arrested by one of the heads 144.

It will thus be seen that a double check is provided on the operation of the machine to insure complete filling of the buckets. In the first place, if any one of the slideways fails to provide its quota of briquets the machine will be stopped, and as an additional safeguard each bucket is tested for a complete measure and in case of shortage in any bucket the machine is automatically stopped.

To prevent sticking of the articles in the slideway one of the guidebars 92 for each slideway has a limited vertical movement, as previously stated. These slidebars are oscillated up and down at each operation of the machine. This oscillation is produced by means of blocks 192 projecting rearwardly at the top end of each side bar 92, as shown in Figs. 13 and 14. Near the top of the frame 14 there is journaled a shaft 193 having a plate 194 thereon which extends beneath the rearwardly projecting blocks 192. This plate is shown in Figs. 3 and 7. Each of the blocks 192 is provided with a spring 195 attached to the plate 194, so that the blocks are yieldingly held downwardly against the top face of the plate. A link 196 is pivoted to an arm 197 secured to the shaft 193, and the lower end of the link is pivoted to an arm 198 secured to the shaft 103. At each oscillation of the shaft 103 the side bars 92 of the slideways will be oscillated up and down to release any briquets within the slideway which have a tendency to clog or stick. The upward movement of the sides 92 of the slideways 95 also frees the top portion of the briquets so they are permitted to move forwardly with the conveyor. It will be seen from Fig. 5 that the lower ends of the slideways just clear the tops of the buckets 77, and since the briquets project above the tops of the buckets it is necessary to raise the forward side members of the slideways to free the tops of the briquets after they have been deposited in the buckets. The bars 92 are normally in the upper position to permit forward movement of the conveyor and are dropped at the time the plungers 97 are released to discharge briquets, as will be apparent from Fig. 9. The offset relation of the slideways 95 permits each briquet after it has been deposited to pass the lower ends of the slideways without interference since the deposited briquets travel in path outside of the succeeding slideways. It will be seen, however, that each briquet must pass the front face of the next succeeding slideway, and if these faces were left open as they are throughout the major portion of the length of the slideway there would be danger that the briquets would turn slightly and that their forward edges would catch in the open fronts of the slideways. To prevent this, thin plates 200 are connected across the front faces of the slideways at their bottom ends.

When the buckets filled with the requisite number of briquets reach the end of the conveyor 12 they are guided about the end sprocket as shown in Fig. 1, and each bucket as it moves downwardly is stopped in a position in which the open face is disposed laterally away from the end of the conveyor. While the bucket is in this position the briquets are slid along the bucket channel and are moved in the direction of the length of the channel out of the bucket. This movement is accomplished by means of a pair of transfer arms 201 and 202. These arms are secured in spaced relation to a shaft 203 mounted for front and rear sliding movement in the frame of the machine. As shown in Fig. 2, the rear end of the shaft 203 is connected to a crosshead 204 having a link 205 pivoted thereto. The opposite end of the link is pivoted to a lever at 206, which is journaled at its lower end to the shaft 112 and which is provided with a cam roller 207 operating in a groove formed in a cam 208 fast on shaft 26. The upper end 209 of the transfer arm 201 has its rear face arranged in alignment with the inner wall of the guide plate 78 at the time that the conveyor is traveling to move a bucket into discharge position. The offset portion 209 of the arm 201 is in alignment with the bucket channel when the bucket comes to rest. As the shaft 203 moves rearwardly the portion 209 slides the briquets before it along the bucket channel and discharges them from the inner end thereof. During this discharge movement the briquets have their forward ends supported on an extension 210 of a receiving plate 211 onto which the briquets are moved from the bucket. The transfer arm 202 carries a head 212 having a rod 213 slidably mounted therein and supporting a contact plate 214 for engaging the inner end of the series of briquets. The contact plate 214 is pushed forwardly by a spring 215 surrounding the rod 213. A shoulder 216 limits the forward movement of the plate 214 so that its forward face is in alignment with the forward face of the guide plate 79 at the time that the bucket is moved into its discharge position. As soon as the transfer arms begin to move rearwardly so as to free the shoulder 216 from the guide plate 79 the spring 215 will move the plate 214 toward the head 209 so as to clamp the briquets between the two transfer arms and thus hold them in their assembled relation during the discharge from the bucket onto the receiving plate 211.

As shown in Fig. 8, a pair of feed rollers 217 are supported on brackets 218 in position to guide a web of paper or other wrapping material past the front face of the receiving plate 211. While the transfer arms 201 and 202 hold the briquets in position on the receiving plate 211 a pusher 220 engages the inner ends of the briquets and moves them to the right as viewed in Fig. 8, from the receiving plate 211 onto a table 221. During this movement the briquets engage the paper 219 which has been cut into proper sizes and is partially folded about the briquets. Other mechanism is provided for further folding the paper about the series of briquets and securely wrapping the same into a package, but the wrapping mechanism is not a part of the present invention except in combination with the assembling mechanism described. The wrappers are supplied from a roll 222 and are severed into proper sizes by knives 223 mounted above the feed rolls 217. The pusher 220 is operated by a lever arm 224 pivotally mounted at 225 and provided with a roller 226 which engages a cam 227 on the shaft 30.

I claim:

1. In hopper discharging mechanism, a roller for feeding articles from a hopper, said roller having spaced abutments thereon forming a groove extending longitudinally of said roller for agitating the articles in said hopper, the outer surfaces of said abutments being extended peripherally of said roller greater distances than the width of said groove.

2. The combination with a hopper, of a roller for controlling the discharge of articles from said hopper, said roller having spaced circumferential grooves therein extending continuously about the periphery of said roller and having a longitudinal groove therein for agitating the articles in said hopper.

3. The combination with a hopper, of a roller for controlling the discharge of articles from said hopper, said roller having a longitudinal groove therein for agitating articles in said hopper and having peripheral grooves therein, spacers between said grooves of greater width than said grooves and means arranged between said peripheral grooves to dislodge articles from said longitudinal groove.

4. The combination with a hopper, of a roller for controlling the discharge of articles from said hopper, said roller having spaced peripheral grooves therein for permitting the discharge of articles from said hopper and having a longitudinal groove therein for agitating articles in said hopper, there being other peripheral grooves between said spaced peripheral grooves and of less width than said spaced peripheral grooves, and tongues projecting into said other peripheral grooves to dislodge articles from said longitudinal grooves.

5. The combination with a hopper, of a roller disposed beneath said hopper for controlling the discharge of articles therefrom, said roller having spaced peripheral grooves therein for receiving articles to be discharged from said hopper, there being intermediate peripheral grooves of less width between said spaced peripheral grooves, and a member arranged adjacent the periphery of said roller and having tongues thereon projecting into said intermediate grooves.

6. The combination with a hopper, of a roller for controlling the discharge of articles from said hopper, said roller having spaced peripheral grooves therein for receiving articles to be discharged from said hopper and having peripheral ribs between said grooves, said ribs having portions cut therefrom to provide a longitudinally extending groove, there being peripheral grooves formed in said ribs of less width than the article receiving grooves and intersecting said longitudinally extending grooves, and a member positioned adjacent the periphery of said hopper and having tongues extending into the periphery of the grooves of said ribs to dislodge articles from said longitudinally extending groove.

7. The combination with a hopper, of a roller disposed beneath said hopper, a second roller adjacent said first-mentioned roller, means for operating said rollers to move the adjacent faces thereof upwardly toward said hopper, said rollers having registering peripheral grooves therein for receiving articles from said hopper, said grooves being spaced apart by distances as great as the width of said grooves each roller having a longitudinal groove therein, the walls of which serve to agitate articles above said rollers.

8. The combination with a hopper having an opening in the lower portion thereof, of a roller disposed beneath said opening, a second roller arranged adjacent said first-mentioned roller, said rollers having registering peripheral grooves therein for receiving articles from said hopper, said grooves being spaced apart by distances as great as the width of said grooves each of said rollers having a longitudinal groove therein the walls of which serve to agitate articles above said rollers, there being ribs on said rollers between said spaced peripheral grooves, each rib having a groove therein and a tongue projecting into said groove to dislodge articles from said longitudinally extending groove.

9. The combination with a hopper, of a pair of rollers disposed adjacent one another beneath said hopper, said rollers having registering peripheral grooves therein for receiving articles from said hopper said grooves being spaced apart by distances as great as the width of said grooves and having longitudinal grooves therein the walls of which serve to agitate the article in said hopper, and means for dislodging articles from said longitudinally extending grooves.

10. The combination with a hopper, of a roller for controlling the discharge of articles from said hopper, said roller having peripherally extending grooves therein for receiving articles to be fed from said hopper the periphery of said roller being disposed adjacent a wall portion of said hopper, there being a longitudinally extending groove in said roller for agitating articles in said hopper, and means for dislodging articles from said longitudinally extending groove to prevent said articles from jamming against said wall portion said means being arranged to register with portions of said roller between said article receiving grooves.

11. The combination with a hopper, of a pair of rollers disposed beneath said hopper for controlling the discharge of articles therefrom, means for rotating said rollers to move the adjacent faces thereof upwardly toward said hopper, said rollers having registering peripheral grooves therein for receiving articles from said hopper and having longitudinal grooves therein the walls of which serve to agitate articles in said hopper, there being supplemental peripheral grooves in said rollers between said registering grooves, and tongues projecting in said supplemental peripheral grooves for dislodging articles from said longitudinal grooves to prevent said articles from jamming against the wall of said hopper.

12. The combination with a pair of feed rollers having registering peripheral grooves therein, of guide bars having the ends thereof disposed beneath said feed rollers and spaced apart, the adjacent edges of said bars being longitudinally grooved to provide guideways registering with the grooves in said feed rollers.

13. The combination with a feed roller having peripheral grooves therein, of spaced vertical guides having the ends thereof disposed adjacent the periphery of said feed roller, the spaces between said guides registering with the grooves in said feed roller to provide discharge slideways for receiving articles from said grooves, said guides having channels therein to retain the articles between said guides.

14. The combination with a pair of feed rollers having spaced peripheral grooves therein forming ridges therebetween, of vertical guides disposed between said rollers and having spaces therebetween registering with the grooves in said feed rollers, said guides being cut away to receive the ridges between said spaced grooves.

15. The combination with a pair of feed rollers having registering peripheral grooves therein, of spaced guides having the ends thereof extending between said feed rollers and having the openings therebetween disposed in registration with said grooves, said guides having the ends thereof beveled to accommodate the portions of said feed rollers between said grooves and having adjacent edges longitudinally grooved.

16. The combination with a pair of feed rollers having spaced peripheral grooves therein, of guides having the ends thereof disposed between said feed rollers and spaced apart to provide openings in registration with the grooves in said feed rollers, said guides having channels formed in adjacent edges thereof to retain articles in position between said guides.

17. The combination with a pair of feed rollers having registering spaced peripheral grooves therein, of guide bars having the ends thereof disposed beneath said feed rollers, said guide bars being spaced apart to provide openings in registration with the grooves in said feed rollers, the ends of said guides having recesses formed therein for receiving portions of said feed rollers between said peripheral grooves and having flanges at the sides of said recesses projecting into said peripheral grooves.

18. The combination with a hopper, of a plurality of guideways for conducting articles away from said hopper, said guideways having receiving ends arranged in alinement and each having a discharge portion disposed at an angle thereto, the angles differing for different guideways to bring the discharge ends thereof into offset relation relative to one another, the discharge ends of said guideways being distributed in the direction of alinement of said receiving ends in the same order as said receiving ends.

19. The combination with a hopper, of a cylinder for discharging material therefrom, a plurality of guide chutes for conducting articles away from said cylinder, said chutes having the discharge ends thereof distributed consecutively in the direction of the axis of said cylinder and arranged in offset relation relative to one another transverse to the direction of said axis.

20. The combination with a hopper, of a pair of rollers for controlling the discharge of articles from said hopper, a plurality of guideways for receiving articles from said rollers, said guideways having receiving ends in alinement with the axes of said rollers and having the discharge ends thereof offset different amounts from the common tangent plane of said rollers.

21. The combination with a plurality of guide chutes having side walls, of means for supplying articles to said guide chutes, and means for moving one wall of each of said chutes while the other wall thereof is stationary to prevent said guide chutes from becoming blocked by said articles.

22. The combination with a hopper for supplying articles, of a guide chute for discharging articles from said hopper, said chute comprising a pair of spaced bars having grooves extending longitudinally along the adjacent faces of said bars, and means for reciprocating one of said bars relative to the other to prevent articles from sticking in said chute.

23. A guide chute for articles comprising a plate, a pair of bars mounted on said plate in spaced relation to one another to form a guideway therebetween, and means for reciprocating one of said bars on said plate while said plate remains stationary to prevent articles from sticking in said guideway.

24. A gravity chute comprising a pair of spaced bars forming a guideway therebetween, and means for longitudinally reciprocating one of said bars relative to the other while said other bar remains stationary to dislodge articles which may have become lodged between said bars.

25. In combination, a plate having a bar fixed thereto, a second bar arranged in spaced relation to said first bar and mounted for longitudinal reciprocation on said plate, said bars having registering grooves arranged in adjacent faces thereof to form a guideway for articles.

26. The combination with a hopper, of discharge rollers having peripheral grooves therein for controlling the discharge of articles from said hopper, and guideways for receiving articles from said hopper, said guideways comprising spaced parallel bars having registering grooves on adjacent faces thereof, means for supporting one of said bars in fixed relation to said rollers and means for reciprocating the other of said bars.

27. The combination with a hopper, of discharge rollers having registering peripheral groves for controlling the discharge of articles from said hopper, guideways having spaced bars forming openings therebetween for receiving articles from said grooves, one bar of each guideway being mounted for longitudinal reciprocation to prevent articles from lodging in said guideways while the other bar of each guideway is held in fixed position.

28. The combination with a hopper having means for controlling the discharge of articles therefrom, of a plurality of spaced bars having guideways therebetween for receiving the articles from said hopper, said bars being arranged in a common plane, and discharge chutes for receiving articles from said guideways, said chutes having their discharge ends offset different amounts relative to the plane of said bars but arranged in the same sequence as the receiving ends of said chutes.

29. The combination with a hopper, of rollers having peripheral grooves therein for controlling the discharge of articles from said hopper, spaced bars arranged in a common plane and providing guideways between said bars for receiving articles from said rollers, and discharge chutes for receiving articles from between said bars, said chutes being arranged at progressively increasing angles relative to said plane to bring the discharge ends thereof into offset relation relative to one another.

30. Assembling mechanism for articles to be wrapped comprising a guide chute, means for moving a wall of said guide chute relative to the other parts thereof to prevent said chute from becoming blocked by articles therein, and means for automatically stopping the operation of said assembling mechanism when a portion of said chute is empty.

31. Assembling mechanism for articles to be wrapped comprising a guide chute, means for longitudinally reciprocating the wall of said guide chute to prevent blocking of said chute by articles therein, and means for automatically stopping the operation of said assembling mechanism in case the discharge portion of said guide chute fails to receive its normal supply of articles.

32. Assembling mechanism for articles to be wrapped comprising a gravity chute, means for longitudinally reciprocating a wall of said chute to prevent blocking of said chute by articles therein, and means for automatically discontinuing the operation of said assembling mechanism when said guide chute fails to function.

33. Assembling mechanism for articles to be wrapped comprising a hopper, a plurality of guide chutes for receiving articles from said hopper, each of said chutes having a movable wall, means for moving said walls to prevent blocking of said chutes by articles therein, and means for automatically stopping the operation of said assembling mechanism, said automatic stopping means being controlled by the articles in said guide chutes.

34. Mechanism for assembling articles to be wrapped comprising a plurality of guide chutes, means for longitudinally reciprocating a side wall of each of said guide chutes to prevent articles from lodging in said chutes, detectors for cooperating with each of said chutes, and means controlled by said detectors for automatically stopping said assembling mechanism whenever any one of said chutes fails to contain its normal supply of articles.

35. Assembling mechanism for articles to be wrapped comprising a plurality of gravity chutes, each having a movable wall, means for reciprocating said movable walls to prevent articles from clogging said chutes, a detector for each chute arranged to cooperate with the article therein adjacent the discharge end of the chute, and means controlled by said detectors for automatically stopping the operation of said assembling mechanism in the absence of an article in the discharge position of any one of said chutes.

36. Assembling mechanism for articles to be wrapped comprising a plurality of guide chutes, means for supplying articles to said guide chutes, a spring-pressed detector arranged to engage the endmost article in each of said guide chutes to hold said article from discharge, means for releasing said detector to permit discharge of said article, and means controlled by said detectors for stopping the operation of said assembling mechanism in the absence of an article in the discharge position in any one of said guide chutes.

37. Assembling mechanism for articles to be wrapped comprising means for supplying said articles, a detector cooperating with said supplying means, a clutch operating member, a device for actuating said clutch operating member, and means controlled by said detector for bringing said clutch operating member and its actuating means into cooperative relation with one another in case of failure of said supplying means to properly function.

38. Assembling mechanism for articles to be wrapped comprising a plurality of guideways, detectors cooperating with each of said guideways, a clutch for controlling the operation of said assembling mechanism, an actuator for said clutch, means for moving said actuator at each operation of said assembling mechanism and means controlled by said detectors for holding said clutch and actuator in cooperative relation to disengage said clutch upon failure of the supply of articles in any one of said guideways.

39. Mechanism for assembling articles to be wrapped comprising a plurality of guideways, a detector for each of said guideways, a movable member cooperating with said detectors, means on each of said detectors for intercepting said movable member in the absence of the normal supply of articles in the guideway corresponding to any one detector, and means controlled by said movable member for stopping the operation of said assembling mechanism.

40. Assembling mechanism for articles to be wrapped comprising a plurality of guideways, a spring plunger arranged to engage the article in each guideway adjacent the discharge position thereof, a movable control member, and means on each of said plungers for intercepting said control member in case said plunger does not contact an article in its guideway.

41. Mechanism for assembling articles to be wrapped comprising a plurality of guideways, detectors comprising spring-pressed plungers for engaging the article in each guideway adjacent the discharge position thereof, a movable control member, means on each of said detectors for intercepting said control member in case the plunger of said detector fails to engage an article in the guideway corresponding to said plunger, and clutch operating means controlled by said movable control member for stopping the operation of said assembling mechanism when said control member is intercepted.

42. Assembling mechanism comprising a plurality of guideways, detectors cooperating with each of said guideways, a movable control device for controlling the operation of said assembling mechanism, means on each of said detectors for intercepting said movable device to cause the operation of said assembling mechanism to be stopped, and means controlled at the will of the operator for intercepting said device to stop the operation of said assembling mechanism.

43. The combination with a plurality of discharge chutes, of plungers arranged to engage articles in said chutes, a reciprocating member for moving said plungers into and out of operating position, a spring interposed between each plunger and said reciprocating member, said spring being compressed by said reciprocating member when said plunger engages an article in said chute, the plungers being movable under the force of said spring to an abnormal position in the absence of the normal supply of articles in said chute, and means controlled by said plunger when in abnormal position for arresting the movement of said assembling mechanism.

44. Assembling mechanism for articles to be wrapped comprising a plurality of discharge chutes each having a movable side, detectors cooperating with said chutes a reciprocating member for actuating said detectors, and means for simultaneously operating said reciprocating member and shifting the movable sides of said chutes.

45. Assembling mechanism for articles to be wrapped comprising a plurality of discharge chutes each chute having one wall thereof mounted for reciprocation relative to the other portions of said chute, detectors cooperating with each chute and arranged to hold the articles therein against discharge movement, means for releasing said detectors, and means for actuating said wall while said detectors are released.

46. Assembling mechanism for articles to be wrapped comprising a plurality of chutes each having a movable wall, spring plungers for engaging articles in said chutes to hold said articles against discharge movement, means for releasing said plungers to permit discharge of articles from said chutes, means for actuating said movable walls during the release of said plungers, and means controlled by said plungers for stopping the operation of said assembling mechanism.

47. Assembling mechanism for articles to be wrapped comprising a discharge chute having a movable wall, a spring plunger for engaging an article in said chute to hold the articles therein against discharge movement, means for releasing said plunger to permit discharge of an article from said chute, and means for moving said movable wall in the direction of discharge of the articles in said chute while said plunger is released.

48. Mechanism for assembling articles to be wrapped comprising an upright gravity chute having a movable wall, a spring plunger for engaging an article in said chute to hold the articles in said chute from discharge movement, means for retracting said plunger to prevent discharge of an article from said chute, means for moving said movable wall downwardly during the release of said plunger and for restoring said wall to its upper position after said downward movement.

49. Mechanism for assembling articles to be wrapped comprising a receptacle for a plurality of articles, means for moving said receptacle, means for successively supplying articles to said receptacle at different positions of said receptacle along its path of movement said articles being disposed at different horizontally displaced positions in said receptacle for each position along the path of said receptacle at which articles are supplied thereto.

50. Mechanism for assembling articles to be wrapped comprising a movable receptacle, and means for supplying an article to said receptacle from each of a plurality of sources distributed along the path of movement of said receptacle said supplying means being arranged to register with different portions of said receptacle.

51. The combination with a movable receptacle, of means for supplying an article to said receptacle from each of a plurality of sources distributed along the path of movement of said receptacle, said sources being offset relative to one another along said path of movement to supply said articles at different positions in said receptacle.

52. Mechanism for assembling a plurality of articles to be wrapped comprising a movable receptacle, guideways having discharge portions disposed in offset relation to one another along the path of movement of said receptacle, and means controlling articles in said guideways to permit the discharge of an article from each guideway as said receptacle is brought into registration therewith.

53. Mechanism for assembling articles to be wrapped comprising a receptacle for receiving a plurality of articles, means for moving said receptacle to different receiving positions and for holding said receptacle stationary in said receiving position, and means for successively discharging articles into said receptacle at the various receiving positions of said receptacle, each article being discharged into said receptacle while said receptacle is stationary and being positioned adjacent the next succeeding article received thereby to form a series of articles positioned side by side in said receptacle.

54. Mechanism for assembling articles to be wrapped comprising a movable receptacle having an elongated recess therein, means for discharging an article into said recess at different positions along the path of movement of said receptacle, each discharging means being disposed in position to register with a different portion of said receptacle to position the articles successively along said recess and adjacent one another during the travel of said receptacle along its path of movement.

55. Mechanism for assembling articles to be wrapped comprising a receptacle, a plurality of discharge devices arranged in offset relation relative to one another along the path of movement of said receptacle, each discharge device being positioned to register with the portion of said receptacle next adjacent the portion with which the next succeeding discharge device registers to cause said articles to be successively disposed adjacent one another in said receptacle at the various positions of said receptacles along its path of movement.

56. Mechanism for assembling articles to be wrapped comprising a conveyor having a plurality of receptacles thereon, means for intermittently moving said conveyor and means for simultaneously depositing articles in each of a plurality of said receptacles while said conveyor is stationary.

57. Mechanism for assembling articles to be wrapped comprising a conveyor having a plurality of receptacles thereon, means for simultaneously depositing articles in a plurality of said receptacles, and means for moving said conveyor to bring said receptacles successively into registration with each of said depositing means said depositing means being offset relative to one another transversely to the path of said conveyor.

58. Mechanism for assembling articles to be wrapped comprising a conveyor having a plurality of receptacles thereon, discharge means spaced along the path of said conveyor, said discharge means being offset relative to one another to cause them to register with different portions of the receptacles in said conveyor, and means for moving said conveyor to bring said receptacles successively into registration with said discharge means.

59. The combination with a conveyor having a plurality of receptacles thereon, of discharge means spaced from one another along the path of movement of said conveyor and offset laterally relative to one another to register with different portions of receptacles on said conveyor, each discharge means being positioned to register with the portion of the receptacle next adjacent that with which the next succeeding discharge means registers, means for moving said conveyor to bring each receptacle successively into registration with each discharge means, means for permitting discharge of articles from each discharge means during registration with each of said receptacles so that each receptacle receives articles disposed progressively adjacent one another across the path of movement of said conveyor as said receptacle moves from one discharge means to the next one.

60. Mechanism for assembling articles to be wrapped comprising a conveyor having a plurality of receptacles thereon, said receptacles being disposed transversely of the path of movement of said conveyor and having sufficient length to receive a predetermined number of articles, a plurality of discharge devices corresponding in number to the number of articles to be supplied to each receptacle, said discharge devices being spaced along the path of movement of said conveyor distances corresponding to the spacing of said receptacles on said conveyor and being offset relative to one another in a direction transverse to the movement of said conveyor amounts corresponding to the thickness of said devices in said direction.

61. Mechanism for assembling articles to be wrapped comprising a conveyor having a plurality of receptacles thereon, discharge devices spaced along the path of movement of said conveyor amounts corresponding to the spacing of said receptacles on said conveyor, means for imparting a step-by-step movement to said conveyor to bring the receptacles thereon successively into registration with said discharge devices, said discharge devices being offset relative to one another in a direction transverse to the direction of movement of said conveyor to permit said discharge devices to supply articles to said receptacles at different positions in said receptacles, and means for permitting the discharge of an article from each of said discharge devices each time said conveyor is moved into position in which the receptacles thereon register with said discharge devices.

62. Mechanism for assembling articles to be wrapped comprising a conveyor having a plurality of receptacles thereon, each receptacle being of a size to receive a predetermined number of articles, discharge devices distributed along the path of movement of said conveyor and offset relative to one another in a direction transverse to the direction of movement of said conveyor, means for moving said conveyor to bring said receptacle successively into registration with the different discharge devices, means for causing simultaneous discharge of articles from said discharge devices into said receptacle, and means for stopping the operation of said assembling mechanism in the absence of an article to be discharged from any one of said discharge devices.

63. Mechanism for assembling articles to be wrapped comprising a conveyor having a plurality of receptacles thereon, a plurality of discharge devices for successively supplying articles to said receptacles, and a detector for checking the operation of said discharge devices, said detector being arranged to cooperate with the articles in the various receptacles after the receptacles have been in registration with said discharge devices.

64. Mechanism for assembling articles to be wrapped comprising a conveyor having a plurality of receptacles thereon, a plurality of discharge devices, means for moving said conveyor to bring said receptacles successively into registration with said discharge devices to permit an article to be supplied to each receptacle from each of said devices, a detector cooperating with each of said discharge devices, means controlled by said detector for arresting the movement of said assembling mechanism in the absence of articles in any one of said discharge devices, and a second detector cooperating with the articles in each of said receptacles after they have been filed by said discharge devices, said second detector being arranged to control said assembling mechanism to stop the operation thereof in case of a shortage in any one of said receptacles.

65. Assembling mechanism for articles to be wrapped comprising a conveyor having a plurality of receptacles thereon, a plurality of discharge devices for successively supplying articles to each of said receptacles, detectors cooperating with each of said supplying means, a detector arranged to cooperate with the articles in a receptacle after it has passed said discharge devices, and means controlled by said detectors for arresting the operation of said assembling mechanism.

66. Mechanism for assembling articles to be wrapped in groups, said mechanism comprising a conveyor having receptacles spaced thereon, each receptacle being of a size to receive a group of articles, discharge devices corresponding in number to the number of articles to be supplied to each receptacle, said discharge devices being spaced from one another along the path of travel of said conveyor amounts equal to the spacing of said receptacles on said conveyor, said discharge devices being offset relative to one another transversely to said conveyor amounts approximately equal to the transverse thickness of the devices to be deposited in said receptacles, means for moving said conveyor intermittently amounts equal to the spacing of the receptacles on said conveyor to successively bring said receptacles into registration with said discharge devices, means for simultaneously discharging an article from each of said discharge devices while receptacles on said conveyor are in registration with said devices, the movement of said conveyor operating to bring each successively into registration with the various discharge devices so that when a receptacle has moved past all of said discharge devices it will be completely filled with articles, and means for testing each receptacle to insure complete filling thereof.

67. The combination with a conveyor having receptacles thereon for receiving articles to be assembled, of a reciprocating control member, a spring-pressed plunger, means for moving said plunger into engagement with the articles in said receptacles, said plunger being arranged to move an additional amount under the pressure of said spring in case of a shortage in any receptacle, and means controlled by said plunger in case of such additional movement to intercept said reciprocating control member.

68. The combination with a conveyor having receptacles therein for receiving articles to be assembled, of means for moving said conveyor, and a test plunger for engaging the articles in said conveyor, said test plunger being movably supported to yield to the movement of said conveyor.

69. The combination with a conveyor having receptacles therein for receiving articles to be assembled, of means for imparting step-by-step movement to said conveyor, a reciprocating control device for said movement imparting means, a plunger for engaging the articles in said receptacles, spring means for moving said plunger into contact with said articles, said spring means being arranged to impart extra movement to said plunger in case of incomplete filling of any receptacle, and means controlled by said plunger for intercepting said reciprocating control device in case of extra movement of said plunger.

70. In combination, a conveyor having a plurality of receptacles thereon for receiving articles to be assembled, means for supplying a plurality of articles to each receptacle, a guide about which said conveyor travels to bring said receptacles into discharge position, and means for removing the articles from said receptacles while in discharge position said discharging means serving to retain the relative arrangement of said articles while being discharged.

71. The combination with a conveyor having receptacles thereon open at their tops and ends, means for supplying articles to said receptacles, a guide about which said conveyor travels, said receptacles being inverted when moved about said guide, and means for extracting the articles from said receptacles when said receptacles have been partially inverted by said guide.

72. The combination with a conveyor having receptacles thereon open at their tops and ends, of a guide about which said conveyor travels, said receptacles being inverted when moved about said guide, a discharge finger arranged to register with the opening of said receptacles when said receptacles are partially inverted by said guide, and means for moving said discharge finger transversely of the movement of said conveyor to slide the articles from said receptacles in a direction transverse to the movement of said conveyor.

73. The combination with a conveyor having receptacles thereon provided with grooves extending in a direction transverse to the direction movement of said conveyor, means for filling said grooves with articles to be assembled, and resilient means for gripping the articles in said grooves and sliding said articles longitudinally of said grooves to remove the articles from the receptacles.

74. The combination with a conveyor having receptacles therein open at their tops and ends, means for filling said receptacles with articles to be assembled, a guide about which said conveyor travels, said receptacles being inverted when moved about said guide, transfer fingers positioned adjacent said guide in position to register with said receptacles when partially inverted, yielding means for urging said fingers toward one another to cause them to grip the articles in said receptacles, and means for moving said transfer fingers to discharge the articles from said receptacles.

75. The combination with a conveyor having receptacles thereon for receiving articles to be assembled, of transfer fingers for engaging the articles in said receptacles, yielding means for urging said fingers toward one another to cause them to grip said articles, a stop for limiting the movement of said yielding means to permit said articles to be brought between said transfer fingers, and means for shifting said yielding means from said stop and to discharge the articles from said receptacles.

76. The combination with a conveyor having receptacles thereon open at their tops and ends, of retainer plates disposed adjacent the path of travel of said conveyor to close the ends of said receptacles, a guide for the end of said conveyor, said receptacles being movable out of engagement with said retainer plates when said conveyor passes about said end guide, transfer fingers disposed adjacent said end guide for registration with the ends of said receptacles, and means for shifting said transfer fingers when in registration with said receptacles to discharge articles from said receptacles.

77. The combination with a conveyor having receptacles thereon provided with channels extending transversely of the direction of movement of said conveyor, of retainers disposed adjacent the path of movement of said conveyor to close the ends of said channels, a pair of transfer fingers disposed adjacent the path of said receptacles and arranged to register with the channels in the said receptacles, yielding means for urging said transfer fingers toward one another to cause them to grip the articles in said channels, wrapping mechanism, means for shifting said transfer fingers to cause them to slide the articles from said channels and to present said articles to said wrapping mechanism, and a stop for arresting said yielding means when said transfer fingers are in position to register with the channels in said receptacles to permit said receptacles to pass between said transfer fingers.

78. Mechanism for assembling articles comprising a receptacle having an open side, means for supplying a plurality of articles to said receptacle, a device for exerting pressure on said articles to determine if said receptacle is properly filled, and means for preventing said articles from buckling under pressure.

79. Mechanism for assembling articles to be wrapped comprising a conveyor having a receptacle therein open at one side, means for supplying a plurality of articles to said receptacle, a cover for the open side of said receptacle beneath which said receptacle is moved, and means for exerting pressure on the articles in said receptacle while beneath said cover to determine whether or not said receptacle is properly filled.

80. Mechanism for assembling articles comprising a gravity chute, a conveyor disposed beneath the lower end of said chute, said chute having a movable side, and means for raising said movable side to permit articles to be carried from the lower end of said chute by gravity.

81. Mechanism for assembling articles to be packed comprising a plurality of chutes, a conveyor movable beneath said chutes for receiving articles therefrom, said chutes being offset relative to one another in a direction transverse to the direction of movement of said conveyor to permit articles deposited from any one of said chutes to pass other chutes without interference, each chute having one side thereof movable to permit articles deposited thereby in said conveyor to be moved from beneath said chute.

82. The combination with a hopper, of a roller for controlling the discharge of articles from said hopper, said roller having the periphery thereof disposed adjacent the wall portion of said hopper, there being peripheral grooves in said roller for receiving articles to be fed from said hopper and a longitudinal groove in said roller for agitating articles in said hopper, the surface of said roller having a peripheral groove therein of less width than said article receiving grooves and intersecting said longitudinal groove, and a tongue projecting into said peripheral groove to dislodge articles from said longitudinal groove to prevent said articles from jamming against said wall portion.

In testimony whereof I have signed my name to this specification on this 19 day of November, A. D. 1924.

MICHAEL J. MILMOE.